United States Patent [19]

Holloway et al.

[11] 4,260,190
[45] Apr. 7, 1981

[54] HINGE FITTINGS

[75] Inventors: Ian P. Holloway, Penkridge; Raymond A. Lloyd, Great Wyrley, both of England

[73] Assignee: H. R. Turner (Willenhall) Limited, West Midlands, England

[21] Appl. No.: 875,514

[22] Filed: Feb. 6, 1978

[30] Foreign Application Priority Data

Feb. 5, 1977 [GB] United Kingdom ................ 4793/77

[51] Int. Cl.³ ............................................ A47C 1/024
[52] U.S. Cl. .................................... 297/361; 297/379
[58] Field of Search ............... 297/361, 362, 354, 355, 297/379, 328, 376; 108/7, 9; 248/397; 16/143, 144, 139; 74/96, 569

[56] References Cited

U.S. PATENT DOCUMENTS

| 2,748,835 | 6/1956 | Barecki ............................ 297/328 X |
| 3,432,881 | 3/1969 | Putsch et al. ..................... 297/362 X |
| 3,866,270 | 2/1975 | Suzuki et al. ..................... 297/379 X |

FOREIGN PATENT DOCUMENTS

| 2222328 | 11/1973 | Fed. Rep. of Germany .......... 297/361 |
| 802176 | 10/1958 | United Kingdom ..................... 297/361 |
| 1052629 | 12/1966 | United Kingdom ..................... 297/361 |

Primary Examiner—William E. Lyddane
Attorney, Agent, or Firm—C. O. Marshall, Jr.

[57] ABSTRACT

A hinge construction especially for a vehicle seat comprises a pair of hinged plates for attachment to the seat base and backrest. One plate rotatably mounts a disc which is formed with a slot of spiral configuration and the other plate is provided with a pin which is received in the slot so that turning of the disc causes relative hinging of the plates.

12 Claims, 6 Drawing Figures

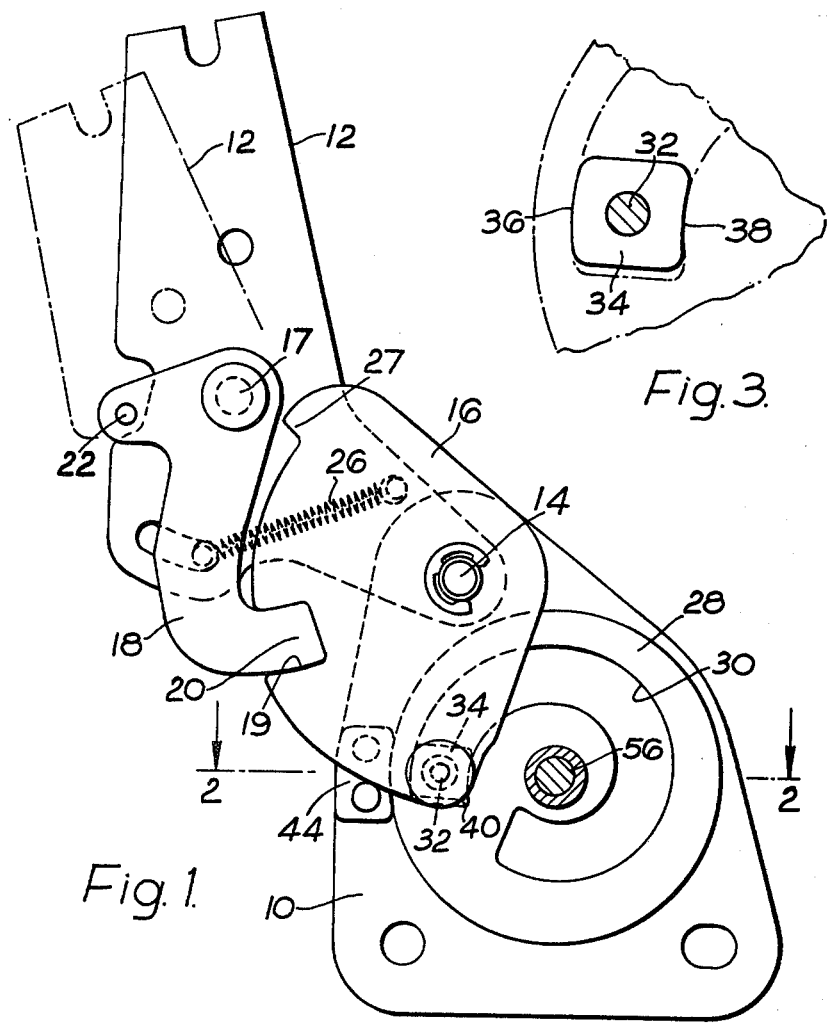
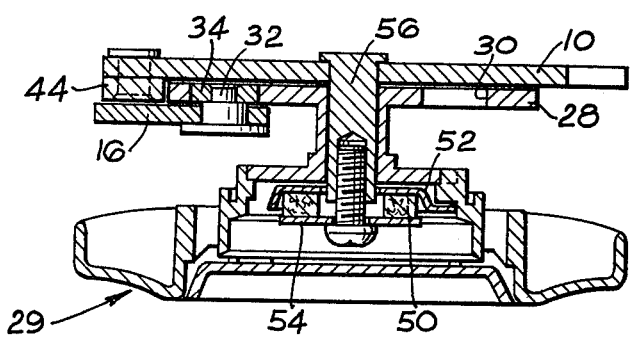

HINGE FITTINGS

This invention relates to hinge fittings, such as are used in motor vehicle seats for connecting the backrest to the seat cushion frame so that the backrest can be adjusted in inclination relative to the seat cushion to suit the requirements of the occupant. The invention is particularly concerned with a hinge fitting which is substantially infinitely adjustable and is capable of adjustment over a relatively small range, of for example about 10° to 25° without entailing laborious operation on the part of the occupant.

According to one aspect of the invention we provide a hinge fitting comprising first and second hinge parts connected pivotally to one another and an adjustment plate mounted on the first hinge part for turning movement about an axis parallel to the hinge axis, the adjustment plate being provided with a slot which extends in spiral fashion about the rotational axis of the plate and which receives a projection provided on the second hinge part whereby the angular relation between the hinge parts varies in response to turning movement of said plate.

Thus rotation of the adjustment plate is accompanied by turning of the slot and such movement is imparted to the second hinge part via said projection. The fitting is very simple and economical to manufacture because the adjustment member and the hinge parts can all be in the form of plates and inclination adjustment is effected by a simple pin and slot arrangement. The amount of adjustment achieved for a given turning angle of the adjustment plate may be varied according to the angle of pitch of the slot and also the spacing between the projection and the hinge axis. To provide a self-locking action, the pitch angle of the slot at any point may be less than the angle of friction. However, as explained hereinafter this is not essential because various modifications can be made to prevent unintended movement of the adjustment plate.

In order to keep the dimensions of the adjustment member reasonably small having regard to the fact that it should be capable of withstanding the applied loads, especially in the area of the radially outermost end of the spiral slot, the adjustment plate is supported over at least part of its periphery directly adjacent the position where the projection is located. For example, an abutment member of limited circumferential extent may be located immediately next to the adjustment member periphery at the appropriate location. Alternatively the adjustment member may be received in a close fit within a cylindrical enclosure, such as a recess or aperture, provided on said first hinge part.

According to a preferred feature of the invention, said projection has freely mounted thereon a slipper block which is also received in said slot, the projection comprising a cylindrical pin engaging in a corresponding bore in the slipper block, the block having curved sides which confront, and generally conform with the curvature of, respective sides of the spiral slot. Thus, one side of the block is of convex curvature and faces a concave side of the spiral and the other side of the block is concave and faces a convex side of the spiral. By appropriate selection of the curvatures of these sides of the block, there may be extended surface contact, as opposed to line contact, between the block and the sides of the spiral slot thereby distributing the pressure across a greater contact area.

According to a further aspect of the invention we provide a hinge fitting comprising first, second and third hinge parts, a user-releasable locking means acting between the second and third parts to couple them together at a predetermined angular setting for angular movement relative to the first part, a permanently engaged user-actuable adjustment mechanism for moving the second and third parts angularly in unison relative to the first part, the arrangement being such that when the locking means is released, the second part is angularly moveable relative to the third part in both angular senses from said predetermined setting.

Preferably all three hinge parts are hinged about a common axis.

This aspect of the invention is particularly applicable to vehicle seats of the kind in which the backrest, in addition to being angularly adjustable to give a range of reclined seating positions suitable for driving, is also rapidly movable, when the locking means is released, forwardly or rearwardly to a forward folded position facilitating access to the rear of a two door vehicle or to a rearward generally horizontal position in which the front seat backrests form a bedding area with the seat cushions of the rear seats. As far as we are aware such an arrangement has not been proposed previously. In known arrangements, the rearward bed position has only been obtainable by labourious adjustment of the backrest via the inclination adjustment mechanism. In the arrangement according to this aspect of the invention, the inclination adjustment need only be effective over say 10°–25° whereas the backrest may have an overall angular movment in excess of 120° when the locking means is released.

In one embodiment, the locking means comprises a latch pivoted on the third part for displacement about an axis parallel to the hinge axis, and a recess in the second part for reception of the free end of the latch. However, according to a further aspect of the present invention, the locking means may comprise an aperture in the one part, e.g. the second part, and a bolt carried by the other part, e.g. the third part, the bolt being mounted for displacement in a direction parallel to the hinge axis and including a portion adapted for entry into the aperture in the manner of a detent. Conveniently the bolt will be spring-biassed towards its locking position in which said portion enters the aperture. When the bolt is not engaged with the aperture, said portions may bear against the adjacent faces of the hinge part provided with the aperture.

The invention will now be described with reference to the accompanying drawings, in which:

FIG. 1 is an elevational view of the hinge fitting with the operating handle omitted;

FIG. 2 is a section on 2—2 in FIG. 1; and

FIG. 3 is a view of one component of the fitting;

Figure 4:
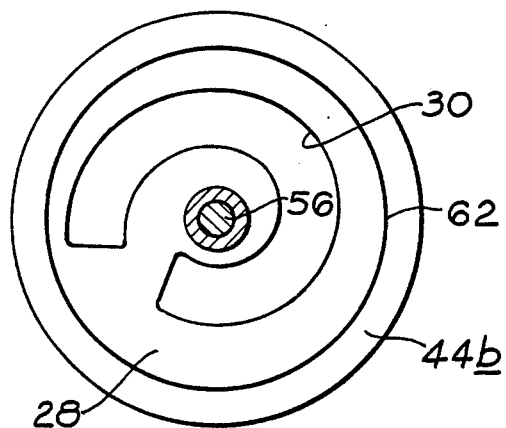
FIG. 4 is a view of an alternative embodiment of the component of the fitting.

Referring now to the accompanying drawings showing one embodiment of the invention, the hinge fitting comprises a plate 10 for connection to one side of a seat cushion frame and a plate 12 for connection to one side of the backrest, both plates 10, 12 being pivotally connected at 14 to define an axis about which the backrest can pivot in use. A plate 16 is also pivoted at 14 and is normally fixed against angular movement relative to the plate 12 by a latch which is pivoted at 17 to the plate 12 and has a finger 20 which, in the latched condition, engages in a recess 19 in the plate 16. The latch 18 is displaceable from the latched position to a position in which finger 20 is disengaged from the recess 19 by a rod (not shown) which is pivotally connected at one end to the latch at 22 and is connected to a suitable user operable lever (not shown) at its other end. A spring 26 biases the latch to the latching position. When the latch is released, the plate 12 and hence the backrest can pivot either forwardly (clockwise as seen in FIG. 1) or rearwardly regardless of the setting defined by the inclination adjustment mechanism which, as will become apparent, is permanently engaged. Such forward pivoting is limited by co-operation of the latch 18 with an abutment 27 and rearward pivoting is limited by a suitable stop arrangement, preferably such that the backrests of the front seats can pivot rearwardly to a generally horizontal position in which it can form a bedding area with the rear seats. It will be noted that the backrest can thus be moved to this position rapidly and independently of the permanently engaged inclination mechanism. The forward pivoting facility is intended for two door vehicles in particular to enable the front seats to be folded in order to facilitate access to the rear seats of the vehicle. It will be understood that the hinge fitting may be duplicated at the other side of the seat. Alternatively, a plain hinge fitting may be provided at the other side of the seat.

The adjustment mechanism comprises a rotor 28 mounted for turning movement on the plate 10. A handwheel 29 or the like accessible to the seat occupant is connected to the rotor 28 to enable the user to turn the rotor (or rotors if the hinge fitting 13 is duplicated at each side of the seat). The rotor in the illustrated embodiment comprises a circular plate, which is preferably a sintered component or alternatively produced by fine blanking, having a spiral slot 30 extending around a major part thereof. As shown, the width of the slot 30 is about 35% of the radius of the plate 28; but it may be of lesser width but preferably greater than 25% of the radius of the plate 28. The plate 16 carries a pin 32 onto which a slipper block 34 is fitted so as to be free for turning relative to the pin, and the pin and block engage in the slot 30. The orientation of the slot 30 is chosen so that, as the rotor turns, the plate 16, and hence the plate 12 with which it is angularly fast, pivot about the axis 14 thereby varying the inclination of the backrest and, if desired, so that, at any position, the pin and block tend to have a self-locking action which enables the plate 16 to be adjusted to a selected inclination and maintained there without any additional holding means.

Because the slot 30 is of spiral configuration, the radii of curvature of its sides continually change from one slot end to the other. The block 34 is provided so as to provide extended area contact surfaces with the slot sides and the sides 36, 38 of the block are therefore arcuately formed to complement, as nearly as possible, the arcuate slot sides. Conveniently, the radii of curvature of the block sides 36, 38 correspond to the respective radii of curvature of the slot sides at the mid-position of the slot. The remaining sides of the block 34 are substantially planar and the ends of the slot 30 are likewise substantially planar.

Figure 5:
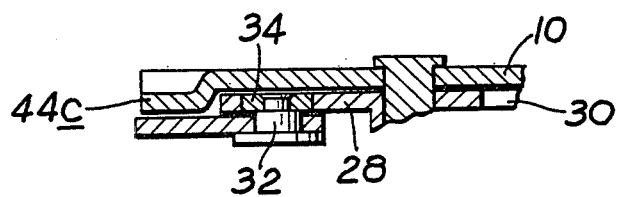
FIG. 5 is a view of another alternative embodiment of the component of the fitting.

It will be noted that the width of material between the radially outermost slot end 40 and the rotor periphery is somewhat less than at the other slot end and consequently this is the weakest section of the rotor. The weakness at this point could be overcome by choosing a rotor of greater diameter; however in accordance with a preferred feature of the invention the problem is dealt with by supporting the rotor periphery especially in the region immediately adjacent the pin and block. In the illustrated embodiment, this support is provided by an abutment 44 which lies on the line passing through the rotor axis and the pin 32 and which has an inner surface 48 engaging with, and conforming to, the periphery of the rotor. Thus, forces tending to urge the backrest forwardly do not stress the weakest zone of the rotor because such forces are supported by the reaction abutment 44. In an alternative embodiment FIG. 4 the support 44b for the rotor 28 can be achieved by mounting the rotor 28 as a close fit within a circular aperture or recess in the plate 10. In another modification, the reaction abutment 44c (FIG. 5) is integral with the plate 10 and is formed, for exaple, by arcuately slotting the plate 10 and pressing out the abutment therefrom such that one of the curved edges of the slot co-operates with the outer periphery of the rotor 28.

The adjustment mechanism affords angular adjustment of the backrest over only a limited range of normal seating positions, e.g. as the rotor is rotated from one limit to the other (as defined by the ends of the slot 30) the backrest plate 12 may be adjusted through say 10°–25° (see the solid and chain-dot outlines in FIG. 1) whereas the overall angular movement allowed when the latch is released may be in excess of 120°.

In a modification of the illustrated embodiment, the latch-type connection between the plates 12 and 16 is replaced by a detent-type connection, e.g. a bolt mounted on the plate 12 for movement normally of the plane of the paper, as viewed in FIG. 1, conveniently under the action of a spring, and an aperture in the plate 16 into which the bolt can enter when the plates 12, 16 are in predetermined angular orientation. The bolt will then be connected to a lever or the like accessible to the user so that the user can disengage the bolt (or bolts if the detent arrangement is provided at each side of the seat) to allow the backrest to be pivoted either forwardly or rearwardly. As soon as the backrest is pivoted from said predetermined orientation, the bolt or bolts can no longer re-engage with the apertures and they may therefore slide over the plates 16 until they register with the apertures once more after the backrest has been returned to its normal position. The advantage of this arrangement is that the bolt is not influenced by the forces that can arise in for instance collisions in the fore-and-aft direction and whilst the bolts travel in opposite directions when entering their respective apertures. Consequently, the effect of a side-on collision is for one bolt to tend to disengage and the other bolt to engage more firmly.

The slot 30 may be so designed that the angle of pitch of the spiral at any position along the slot is less than the angle of friction thereby providing a self-locking action.

However this is not essential; indeed the spiral angle of pitch of the slot 30 in the illustrated embodiment is slightly larger than the angle of friction and any tendency for the slipper block to slide along the slot 30 can be overcome by providing some means for resisting unintended angular movement between the parts. Thus, in order to afford such resistance as well as to take up play between the rotor 28 and the plate 10 in the illustrated embodiment without making turning of the rotor difficult, a resilient friction element 50 is arranged to act between the rotor and the plate 10. This element may comprise a resiliently deformable annular microcellular friction pad as shown or a "wavy"-type washer. The pad 50 is compressed between a dish-shaped element 52 rotatabe with handle 29 and a washer 54 screw-connected to a stem 56 which is fast with the plate 10 and serves to journal the rotor 28. Thus, any tendency for the rotor 28 to move from a selected position of adjustment is resisted by the friction coupling between the element 52 and the washer 54. Other forms of securing frictional resistance to turning of the rotor 28 are of course possible within the scope of the invention.

In a modification the spiral angle of pitch can be made larger than the angle of friction by employing a spiral-type slot whose sides are profiled in such a way as to form depressions into which the pin can enter and remain. In this modification the slipper block may be omitted and the pin enlarged but only to such an extent that it can freely pass between raised junctions between such depressions on either side of the slot. One way of forming such a slot is by end milling the rotor plate at closely adjacent angular intervals, e.g. at 5° intervals, so that each slot side comprises a series of part-circular concavities with cusp-like junctions between each pair of concavities.

Figure 6:
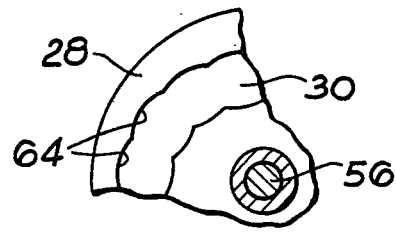
FIG. 6 is a view of still another alternative embodiment of the component of the fitting.

In FIG. 6, the slot 30 has the sides thereof formed with a series of part-circular cavities 64.

If desired, a spring may be incorporated in each hinge fitting at the sides to bias the backrest towards the latching position. In this event, there may be a second latching position to hold the backrest in the "bed" position.

Having now described our invention what we claim is:

1. A hinge fitting comprising first and second hing parts connected pivotally to one another and an adjustment plate mounted on the first hinge part for turning movement about an axis parallel to the hinge axis, the adjustment plate being provided with a slot which extends in spiral fashion about the rotational axis of the plate and which receives a projection provided on the second hinge part whereby the angular relation between the hinge parts varies in response to turning movement of said plate, the adjustment plate being supported by a reaction member over at least part of its periphery in the vicinity of said projection, the reaction member also being mounted on said first hinge part, whereby loads are transmitted from said projection to the reaction member through that portion of the adjustment plate which lies radially outwardly of the slot without creating any substantial stresses in that portion of the adjustment plate.

2. A hinge fitting as claimed in claim 1 in which the projection has a slipper block freely mounted thereon, said block being received within the slot and having curved sides which confront respective sides of the slot and whose curvatures approximate those of the slot sides.

3. A hinge fitting as claimed in claim 1 in which the slot is at least 300° angular extent.

4. A hinge fitting as claimed in claim 1 in which the width of the slot is at least 25% of the radius of the adjustment plate.

5. A hinge fitting as claimed in claim 1 in which the angle of pitch of the spiral slot is less than the angle of friction.

6. A hinge fitting as claimed in claim 1 in which the angle of pitch of the spiral slot is not less than the angle of friction and in which friction means is provided to resist unintended turning of the adjustment plate from a preselected setting.

7. A hinge fitting as claimed in any one of claim 1 in which the sides of the slot are profiled so as to form depressions in which the projection can seat.

8. A hinge fitting as claimed in claim 1 including a third hinge part and a user-releasable locking means acting between the second and third parts to couple them together at a predetermined angular setting for angular movement relative to the first part, the arrangement being such that when the locking means is released, the second part is angularly movable relative to the third part in both angular senses from said predetermined setting.

9. A hinge fitting as claimed in claim 8 in which all three hinge parts are hinged about a common axis.

10. A hinge fitting comprising first and second hinge parts connected pivotally to one another and an adjustment plate mounted on the first hinge part for turning movement about an axis parallel to the hinge axis, the adjustment plate being provided with a slot which extends in spiral fashion about the rotational axis of the plate and which receives a projection provided on the second hinge part whereby the angular relation between the hinge parts varies in response to turning movement of said plate, the adjustment plate being supported by a reaction member over at least part of its periphery in the vicinity of said projection whereby loads are transmitted from said projection to the reaction member through that portion of the adjustment plate which lies radially outwardly of the slot without creating any substantial stresses in that portion of the adjustment plate, the reaction member also being mounted on said first hinge part and comprising an abutment of limited circumferential extent having a curved face conforming to the periphery of the adjustment plate.

11. A hinge fitting as claimed in claim 10 in which said abutment is pressed out from the first part.

12. A hinge fitting comprising first and second hinge parts connected pivotally to one another and an adjustment plate mounted on the first hinge part for turning movement about an axis parallel to the hinge axis, the adjustment plate being provided with a slot which extends in spiral fashion about the rotational axis of the plate and which receives a projection provided on the second hinge part whereby the angular relation between the hinge parts varies in response to turning movement of said plate, the adjustment plate being supported by a reaction member over at least part of its periphery in the vicinity of said projection whereby loads are transmitted from said projection to the reaction member through that portion of the adjustment plate which lies radially outwardly of the slot without creating any substantial stresses in that portion of the adjustment plate, the reaction member being formed by a circular recess in said first hinge part in which the adjustment plate is received as a close fit.

* * * * *